United States Patent
Kesavan et al.

(10) Patent No.: US 9,727,902 B2
(45) Date of Patent: Aug. 8, 2017

(54) MITIGATING DISTRIBUTION AND CONSUMPTION OF COUNTERFEIT PRODUCTS

(75) Inventors: Sanjay Mecheri Kesavan, Karnataka (IN); Nataraj Nagaratnam, Durham, NC (US); Lohitashwa Thyagaraj, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1949 days.

(21) Appl. No.: 12/791,933

(22) Filed: Jun. 2, 2010

(65) Prior Publication Data
US 2011/0302093 A1     Dec. 8, 2011

(51) Int. Cl.
| G06Q 10/10 | (2012.01) |
| G06Q 30/02 | (2012.01) |
| G06Q 30/06 | (2012.01) |
| G06Q 10/04 | (2012.01) |
| G06Q 10/06 | (2012.01) |
| G06Q 30/00 | (2012.01) |

(52) U.S. Cl.
CPC ....... *G06Q 30/0603* (2013.01); *G06Q 30/018* (2013.01); *G06Q 30/0185* (2013.01)

(58) Field of Classification Search
CPC ................................................... G06Q 30/018
USPC ......................................... 705/317, 1.1–912
See application file for complete search history.

(56) References Cited

U.S. PATENT DOCUMENTS

| 7,162,035 B1 | 1/2007 | Durst et al. |
| 7,387,249 B2 | 6/2008 | Hudson et al. |
| 2003/0141358 A1* | 7/2003 | Hudson et al. ............... 235/375 |
| 2005/0150964 A1 | 7/2005 | Lo |
| 2011/0276502 A1* | 11/2011 | Dameri ........................ 705/317 |

FOREIGN PATENT DOCUMENTS

| WO | 2008012225 A1 | 1/2008 |
| WO | 2008056105 A1 | 5/2008 |

OTHER PUBLICATIONS

Lehtonen-et al.; "Trust and security in RFID-based product identification systems"; INSPEC/IEEE; vol. 1, No. 2 pp. 129-144; Dec. 2007.
Adnan-Ariffin, S.; "Secure Supply Lines"; DIALOG/INSPEC; Mar. 2009.

(Continued)

*Primary Examiner* — Jonathan Ouellette
(74) *Attorney, Agent, or Firm* — Garg Law Firm, PLLC; Rakesh Garg; Richard Wilhelm

(57) ABSTRACT

A method, system, and computer usable program product for mitigating distribution or consumption of counterfeit products in a supply chain are provided in the illustrative embodiments. A first set of identifiers is generated to associate with a product to be manufactured. The first set of identifiers includes identifiers corresponding to a customer reference number (CRN), a customer acknowledgment number (CAN), and a merchant acknowledgment number (MAN). The first set of identifiers is associated with the product and a status indicator. The status indicator is set to a first value representative of the product being an original product and the product being available for sale. The first set of identifiers is transmitted to another second application.

20 Claims, 9 Drawing Sheets

(56) References Cited

OTHER PUBLICATIONS

Vitharanan, P.; "Risks and Challenges of Component-Based Software Development"; ACM Digital Library: vol. 26, No. 8; Aug. 2003.
Oyomno-et al. "Privacy Implications of Context-Aware Services"; ACM Digital Library; Jun. 2009.

* cited by examiner

FIG. 6

CDS 602

RECORDS 604

| CRN | CAN | MAN | STATUS | |
|---|---|---|---|---|
| 63E4N876732AW | 9736XhtA99 | 7831DjjM12 | 0 | 606 |
| 63E4N8767322A | 9736XhtA100 | 7831DjjM13 | 0 | |
| 63E4N876732A3 | 9736XhtA101 | 7831DjjM14 | 0 | |
| 63E4N876732A4 | 9736XhtA102 | 7831DjjM15 | 0 | |
| 63E4N876732A5 | 9736XhtA103 | 7831DjjM16 | 0 | |
| 63E4N876732A6 | 9736XhtA104 | 7831DjjM17 | 0 | |
| 63E4N876732A7 | 9736XhtA105 | 7831DjjM18 | 0 | |
| 63E4N876732A8 | 9736XhtA106 | 7831DjjM19 | 0 | |

FIG. 7

CDS 702

RECORDS 704

| CRN | CAN | MAN | STATUS | |
|---|---|---|---|---|
| 63E4N876732AW | 9736XhtA99 | 7831DjjM12 | 1 | 706 |
| 63E4N8767322A | 9736XhtA100 | 7831DjjM13 | V | 708 |
| 63E4N876732A3 | 9736XhtA101 | 7831DjjM14 | 0 | |
| 63E4N876732A4 | 9736XhtA102 | 7831DjjM15 | 0 | |
| 63E4N876732A5 | 9736XhtA103 | 7831DjjM16 | 0 | |
| 63E4N876732A6 | 9736XhtA104 | 7831DjjM17 | 0 | |
| 63E4N876732A7 | 9736XhtA105 | 7831DjjM18 | 0 | |
| 63E4N876732A8 | 9736XhtA106 | 7831DjjM19 | 0 | |

MITIGATING DISTRIBUTION AND CONSUMPTION OF COUNTERFEIT PRODUCTS

RELATED APPLICATION

The present invention is related to similar subject matter of co-pending and commonly assigned U.S. patent application Ser. No. 12/791,938 entitled "IMPROVING MANUFACTURING AND DISTRIBUTION TO AVOID COUNTERFEIT PRODUCTS," filed on Jun. 2, 2010, and U.S. patent application Ser. No. 12/791,943 entitled "PRE AND POST PURCHASE IDENTIFICATION OF COUNTERFEIT PRODUCTS," filed on Jun. 2, 2010, which are hereby incorporated by reference.

BACKGROUND OF THE INVENTION

1. Field of the Invention

The present invention relates generally to an improved data processing system, and in particular, to a computer implemented method for managing information about products in a supply chain. Still more particularly, the present invention relates to a computer implemented method, system, and computer usable program code for mitigating the distribution and consumption of counterfeit products.

2. Description of the Related Art

Today, distribution and selling of counterfeit products has become a significant problem in the global marketplace. Almost every country, every region, every industry suffers some loss due to the presence of counterfeit products along with the original products.

An original product is a product distributed, sold, or consumed according to the instructions of the rightful manufacturer of the product. A counterfeit product is a product that is not an original product. For example, a product that is a copy or a replica of an original product, intended for distribution, sale, or consumption as the original product, without the authorization of the manufacturer of the original product, is a counterfeit product. As another example, an original product that is distributed, sold, or consumed outside a date range or time period suggested by the manufacturer of the original product may also be considered a counterfeit product.

Some anti-counterfeit solutions currently exist in the market. However, none of these solutions provide a robust enough method to reduce or eliminate the distribution and selling of counterfeit products. The adverse effects of counterfeit products are diverse and far-reaching. For example, the pharmaceutical industry is one of the most widely affected industries when it comes to counterfeit products. Both the developed and the developing countries are suffering from counterfeit drugs that harm the health of the people, infringe upon the rights of the pharmaceutical companies, and violate the laws of sovereign nations and states.

As another example, nearly forty percent of consumer package goods (CPG) sold around the world are regarded as counterfeit for one reason or another. As another example, the Automobile Manufacturers Association indicates that counterfeit auto parts are a twelve billion dollar problem globally, causing a loss of approximately three billion dollars in the United States alone.

The list of counterfeit products is ever growing. Some of the product types that are most susceptible to counterfeiting include pharmaceuticals, CPG, Apparels, automotive parts, electronics and electrical equipment, beverages and tobacco products, toys, baby food, construction materials, agricultural products, and food products.

The effects of counterfeiting can be direct or indirect. For example, health problems, harm to equipment, loss of goodwill, and loss of revenue are some of the direct problems associated with counterfeiting. Local and global economic crisis, child labor, and violation of human rights are some of the indirect consequences of counterfeiting.

SUMMARY OF THE INVENTION

The illustrative embodiments provide a method, system, and computer usable program product for mitigating the distribution and consumption of counterfeit products. An embodiment generates, in a first application executing in a first data processing system, a first set of identifiers to associate with a product to be manufactured. The first set of identifiers includes identifiers corresponding to a customer reference number (CRN), a customer acknowledgment number (CAN), and a merchant acknowledgment number (MAN). The embodiment associates the first set of identifiers with the product and a status indicator. The embodiment sets the status indicator to a first value representative of the product being an original product and the product being available for sale. The embodiment transmits the first set of identifiers from the application to a second application.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 6 depicts an example repository of CRN, CAN, and MAN sets maintained in a CDS in accordance with an illustrative embodiment;

FIG. 7 depicts an example repository of CRN, CAN, and MAN sets updated in a CDS in accordance with an illustrative embodiment;

DETAILED DESCRIPTION OF THE PREFERRED EMBODIMENT

Figure 1:
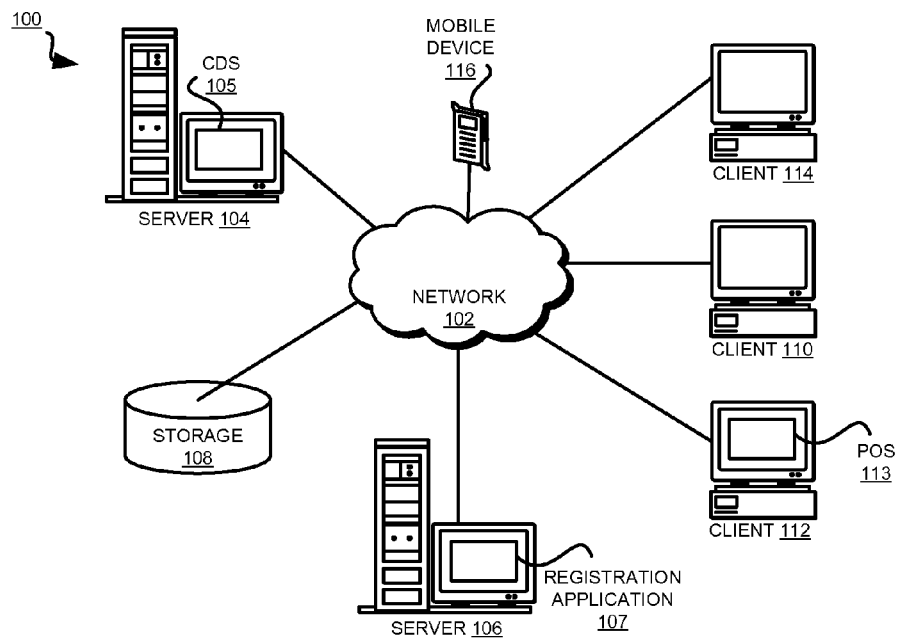
FIG. 1 depicts a pictorial representation of a network of data processing systems in which the illustrative embodiments may be implemented.

The invention recognizes that the introduction of counterfeit products can occur at any of the several points in a given supply chain. For example, shops, distributors, retail outlets, suppliers, brokers, export/import points, warehouses, or transportation between points can each potentially be a point where a counterfeit product may be introduced. Accordingly, the invention recognizes that tracking the movement of products from a producer to a consumer is not always easy, practicable, or even sufficient for reducing or eliminating counterfeits.

For example, the invention recognizes that a common supply chain may include hundreds if not thousands of manufacturers. Each manufacturer may produce several brands or types of products. Each brand or type of product may include thousands of product items. Each distributor, broker, or distribution point may receive products for several supply chains from several suppliers. Each supplier may stock several products of several brands or types from several manufacturers. A retailer may source from several suppliers and/or distribution points.

Thus, the invention recognizes that between the producer and the consumer of a specific product, the transactions become complex and intermingled with many other factors affecting the supply chain. Accordingly, simply tracking a product is insufficient for preventing the introduction, distribution, and consumption of counterfeit products in a supply chain.

Radio Frequency Identification (RFID), holograms, product registration systems, chemical dyes, and bar codes are some example solutions that are presently used to address counterfeiting of products to some extent. For example, some producers tag their products with RFID tags to track the movement of those products. However, the primary purpose of using RFID tags is for asset management, inventory control, production tracking, and shipping and receiving.

However, the invention recognizes that RFID solutions do not provide an adequate method to deal with preventing the distribution or consumption of counterfeit products. For example, an RFID solution does not track the sales of counterfeit products; cannot stop injection of counterfeit products into market; and does not provide a mechanism for consumers to validate and identify if products or original or counterfeit. Importantly, from a consumer perspective, existing solutions do not provide a trusted source to validate authenticity of a product or to identify a counterfeit product.

The invention recognizes that in many cases, a producer cannot answer affirmatively and with confidence whether the product that is sold is the original product the producer manufactured. Similarly, in many cases, a consumer cannot answer affirmatively and with confidence whether the product that was purchased is the original product that was manufactured.

Preventing counterfeits from entering the market is not always possible for the producers due at least to the size of the global supply chain in general. Detecting a counterfeit is not always possible for a consumer due to the striking similarities between the counterfeit and the original products and many other reasons.

The illustrative embodiments used to describe the invention generally address and solve the above-described problems and other problems related to counterfeit products in a supply chain. The illustrative embodiments provide a method, computer usable program product, and data processing system for mitigating the distribution and consumption of counterfeit products.

An embodiment of the invention may bridge the gap between the producers and consumers in an existing supply chain as relates to the distribution or consumption of counterfeit precuts. An embodiment may be implemented as a unique "service" based solution that allows producers and consumers to nearly instantly determine whether a particular product is an original product or counterfeit, based on a trust relationship with a third-party system.

An embodiment may facilitate the monitoring of products being introduced into a supply chain to be sold, and monitoring of products to be purchased. Using an embodiment, a consumer may determine near instantly whether a product is original or counterfeit prior to purchase as well as after the purchase. An embodiment may prevent counterfeits to be introduced through resale channels.

Within the scope of the invention, an offline transaction (OFT) is a transaction that occurs using a brick and mortar establishment. An online transaction (ONT) is a transaction that occurs using electronic storefronts. A counterfeit detection service (CDS) is an embodiment according to the invention that serves as a third party system or service for mitigating the distribution or consumption of counterfeit products.

Generally, within the scope of the invention, a product may be a single unit or a group of units to be manufactured, packaged, or sold together. A customer or consumer is any entity that buys or otherwise procures a product. A producer or manufacturer is any entity that manufactures, packages, or otherwise acts as a source for a product. A merchant is any entity that sells, transfers, or otherwise gives title to a product to a consumer.

A customer reference number (CRN) is an identifier of any suitable type or form suitable for uniquely identifying a product. A customer acknowledgment number (CAN) is an identifier of any suitable type of form usable by a customer for determining the authenticity of a product. A merchant acknowledgment number (MAN) is an identifier of any suitable type of form usable by a merchant for determining the authenticity of a product. Some example forms of CRN, CAN, or MAN identifiers may be any string such as for example, "abcdef", "ajshdq9122uwjkd", "12897343786234", "xyz:39*(@&#Kdu)Ja10", "abc>34σ./ 00000Σ3456¬∞□¢", "abc; cdf, "1234; 56/9087-ooop123", an image, or a graphic representation.

The illustrative embodiments are described with respect to data, data structures, and identifiers only as examples. Such descriptions are not intended to be limiting on the invention. For example, an illustrative embodiment described with respect to numeric identifier may be implemented using an alphanumeric identifier, a symbolic identifier, or a combination thereof, in a similar manner within the scope of the invention.

Furthermore, the illustrative embodiments may be implemented with respect to any type of data processing system.

For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
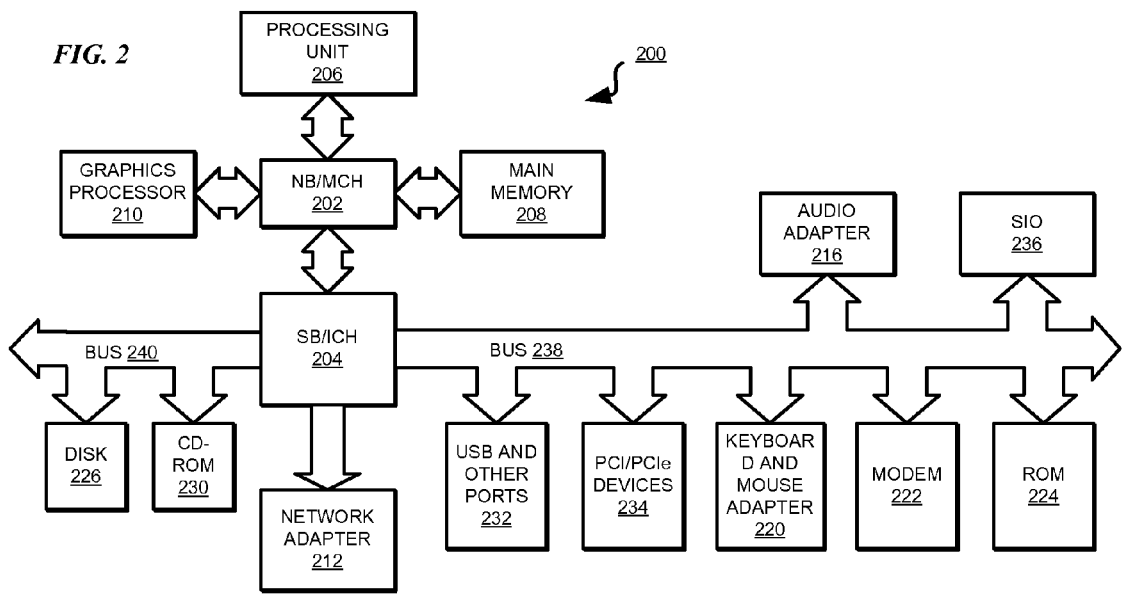
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include CDS 105. Server 106 may include registration application 107 usable by a manufacturer in accordance with an illustrative embodiment. POS 113 may be a point of sale application usable by a merchant in accordance with an illustrative embodiment. Mobile device 116 may be any mobile device, such as a cellular phone, usable by a consumer in accordance with an illustrative embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
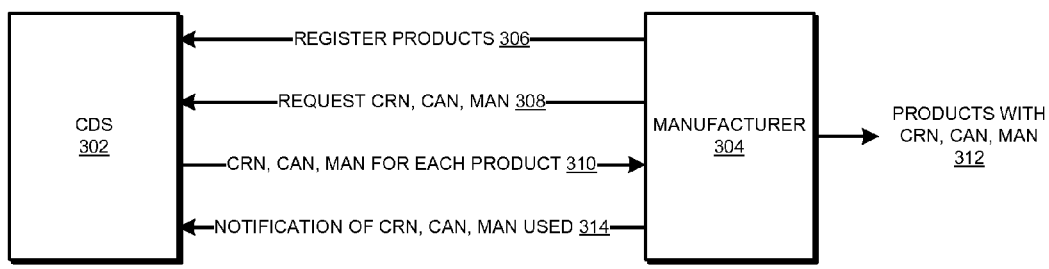
FIG. 3 depicts a block diagram of a registration phase of the mitigation process according to an embodiment.

With reference to FIG. 3, this figure depicts a block diagram of a registration phase of the mitigation process according to an embodiment. CDS 302 may be similar to CDS 105 in FIG. 1. Manufacturer 304 may be a manufacturer entity and may include a system, such as registration application 107 in FIG. 1.

Manufacturer 304 may sends message 306 to CDs 302 to register a set of products. A set of products is one or more products. Message 306, as an example, may include identifiers associated with manufacturer 304, and one or more products in the set of products. Message 306 may inform CDS 302 to associate the registered products with manufacturer 304.

Manufacturer 304 sends request 308 to CDS 302. Request 308 may be a request for unique sets of CRN, CAN, and MAN for a set of registered products. A set of CRN, CAN, and MAN includes at least one value each for the CRN, the CAN, and the MAN identifiers such that the combination of all or a subset of the three values can uniquely identify a unit of a product. For example, brand ABC model DEF of a wrist watch may be a product. Each unit manufactured of that brand and that model is a unit of the product. A unit is a unit of manufacture. Each unit has a unique CRN, CAN and MAN to uniquely identify the unit. Within the scope of this disclosure, an aspect of an embodiment described with respect to a product is similarly applicable to a unit of the product.

Furthermore, in one embodiment, the CRN, CAN, and MAN identifiers may be unrelated to one another. In one embodiment, given one of the three identifiers, the other two may be computable from the given identifier. For example, given a CRN, corresponding CAN and MAN identifiers may be computable. Under certain circumstances, the embodiment where the three identifiers are unrelated, to wit, not derivable from one another, may be preferable over the other embodiment where two identifiers are derivable from the third identifier.

Under certain other circumstances, the embodiment where two identifiers are computable from the third identifier may be preferable over the embodiment with unrelated identifiers. For example, having computable or derivable identifiers may be acceptable when the derivation algorithm is not easily discoverable and where local computation of the identifiers provides improved transaction speed or other advantage. In any embodiment, a CRN, CAN, and MAN set once used or assigned to a unit of a product is preferably not reused.

Request 308 may include a subset of products in message 306 or may include a different set of products from message 306. For example, request 308 may include some products from message 306 and some products for from a previous registration.

CDS 302 returns the requested CRN, CAN, and MAN sets 310. CDS 302 maintains a repository, such as a database, of all CRN, CAN, and MAN sets CDS 302 issues to various manufacturers. Furthermore, CDS 402 maintains in such a repository, one or more status indicators associated with each set of CRN, CAN, and MAN. Among other indications, such a status indicator can be used to indicate whether the associated set of CRN, CAN, and MAN (and thereby the associated product) is available for sale, has been sold, has been voided, or has participated in another transaction or manipulation, for example, resale.

Manufacturer 304 may produce products 312 using all or some of CRN, CAN, and MAN sets 310. Manufacturer 304 associates one set of CRN, CAN, and MAN with one product unit without reusing the set. For example, manufacturer 304 may print the CRN, CAN, and MAN identifiers on a product label, product packaging, or product component, or otherwise associate the set with a product unit.

Manufacturer 304 may send notification 314 to CDS 302. Notification 314 notifies CDS 302 about which combinations of CRN, CAN, and MAN sets 310 were used in products 312. CDS uses notification 314 to mark, update, or otherwise record the status of the various sets of CRN, CAN, and MAN 310.

Figure 4:
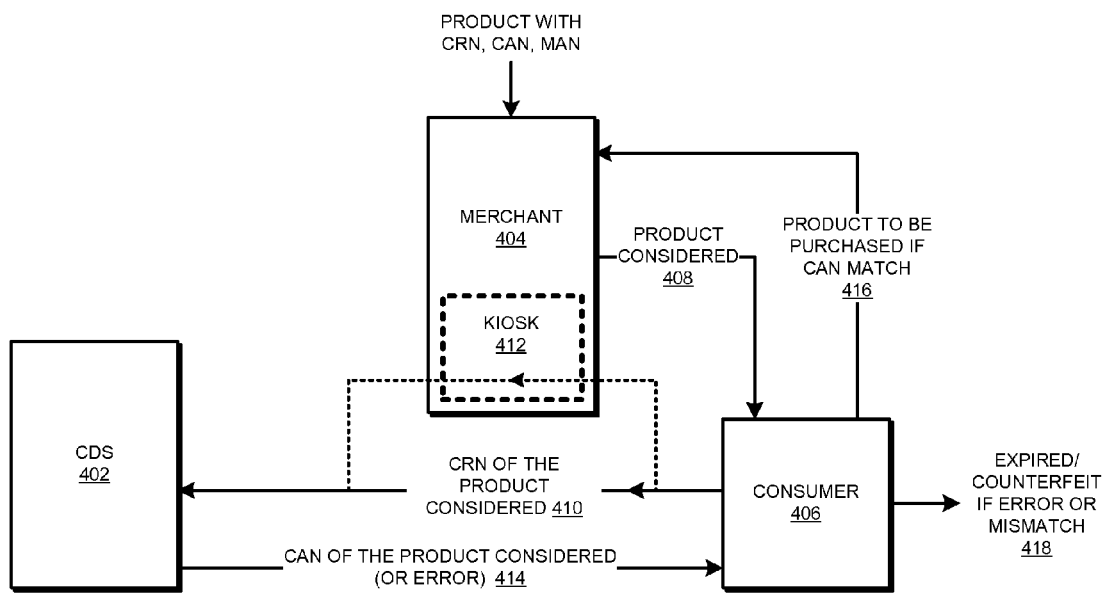
FIG. 4 depicts a block diagram of an inquiry phase of the mitigation process according to an embodiment.

With reference to FIG. 4, this figure depicts a block diagram of an inquiry phase of the mitigation process according to an embodiment. CDS 402 may be similar to CDS 302 in FIG. 3. Merchant 404 may be a merchant entity including a POS system, such as POS 113 in FIG. 1. Consumer 406 may be a consumer entity, such as a consumer entity including mobile device 116 in FIG. 1.

Merchant 404 may receive one or more product with CRN, CAN, and MAN set associated therewith, for example, products 312 in FIG. 3. Product 408 may be a product that consumer 406 may consider purchasing from merchant 404. Consumer 406 sends message 410 including the CRN of product 408 to CDS 402. Consumer 406 may send message 410 using a mobile device in consumer's access, or via a system, such as at a data processing system at kiosk 412, accessible to consumer 408 at merchant 406.

CDS 402 uses message 410 to locate a set of CRN, CAN, and MAN that corresponds with the CRN included in message 410. CDS 402 returns message 414 to consumer 406. If CDS 402 is successful in finding a set of CRN, CAN, and MAN whose status indicates that the associated product is original and available for purchase, message 414 includes the CAN identifier from the set. If CDS 402 fails to find a corresponding set of CRN, CAN, and MAN, or determines that the CRN of message 410 is invalid, or if the set is found but the associated status indicates that the product has been sold or is otherwise unavailable for purchase CDS 402 may return an error message or error identifier in message 414.

If consumer 406 determines that message 414 includes a CAN that matches the CAN identifier printed on or associated with product 408, consumer 406 may indicate 416 that product 408 is to be purchased. If consumer 406 determines that message 414 includes an error message or identifier, consumer 406 may determine that product 408 is expired or counterfeit 418. If consumer 406 determines that the CAN identifier in message 414 does not match the CAN identifier printed or associated with product 408, consumer 406 may determine that product 408 is a counterfeit product.

Figure 5:
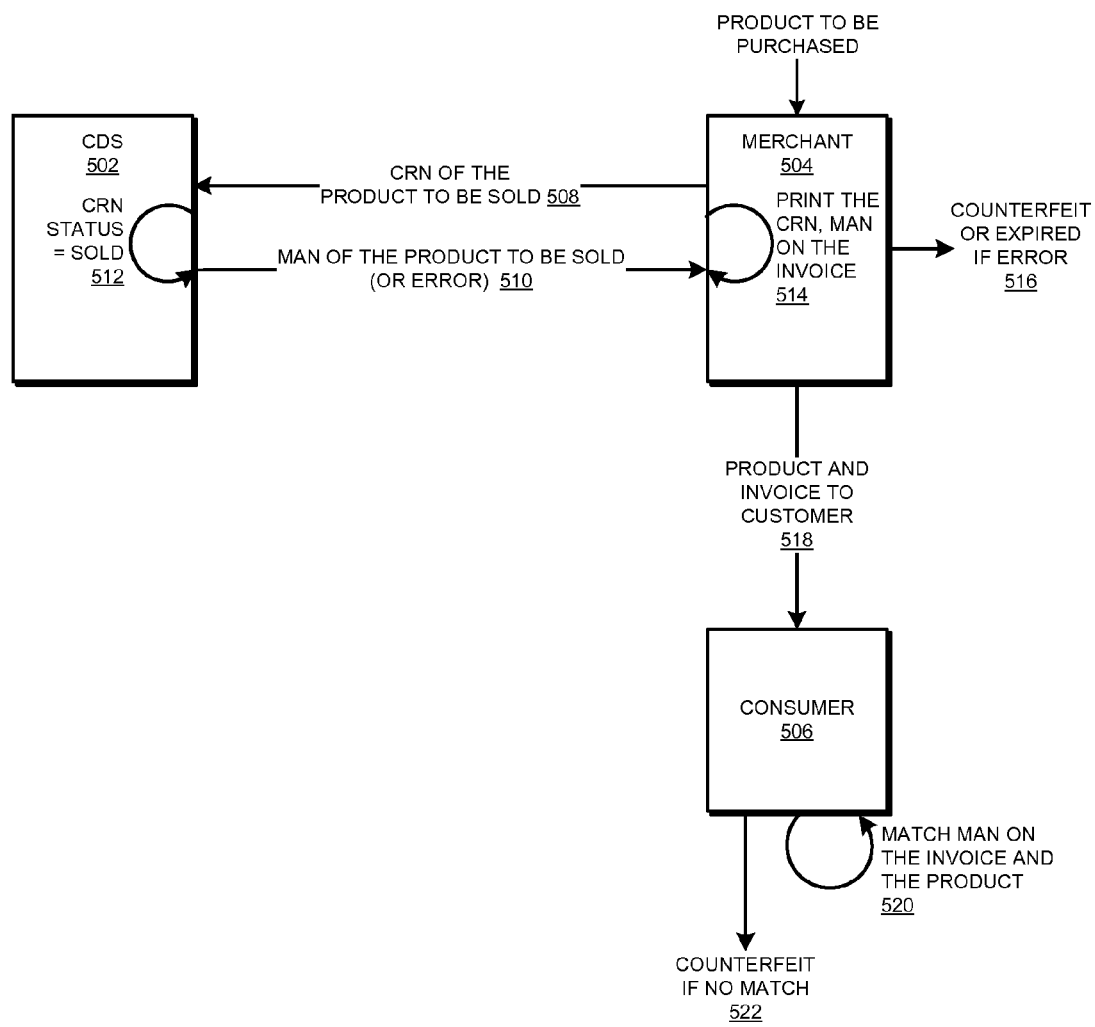
FIG. 5 depicts a block diagram of a purchase phase of the mitigation process according to an embodiment.

With reference to FIG. 5, this figure depicts a block diagram of a purchase phase of the mitigation process according to an embodiment. CDS 502 may be similar to CDS 402 in FIG. 4. Merchant 504 may be similar to merchant 404 in FIG. 4. Consumer 506 may be similar to consumer 406 in FIG. 4.

Merchant 504 may receive an indication, such as indication 416 in FIG. 4, that one or more product having CRN, CAN, and MAN set associated therewith are to be purchased. Merchant 504 may send message 508 to CDS 502 including the CRN of the product to be sold. CDS 502 returns message 510 to merchant 504. If CDS 502 is successful in finding a set of CRN, CAN, and MAN, whose CRN matches the CRN in message 508, and whose status indicates that the associated product is original and available for purchase, message 510 includes the MAN identifier from the set. Upon returning a MAN identifier in message 510, CDS 502 changes the CRN, CAN, and MAN set's status to "sold". An implementation may indicate the "sold" status in any suitable way within the scope of the invention. For example, 0 may indicate an available for sale status and 1 may indicate a sold status.

If CDS 502 fails to find a set of CRN, CAN, and MAN corresponding to the CRN in message 508, or determines that the CRN of message 508 is invalid, or if the set is found but the associated status indicates that the product has been sold or is otherwise unavailable for purchase CDS 502 may return an error message or error identifier in message 510. No status change occurs in a record in CDS 502 when CDS 502 returns an error in message 510.

Merchant 504 associates 514 the CRN and the MAN of message 508 and 510 with a document of sale of the product to be purchased and sells the product. For example, merchant 504 may print the CRN and the MAN identifiers on the invoice or bill of sale for the product.

If merchant 504 receives and error indicator or error message in message 510, merchant 504 determines 516 that the product to be sold is either a counterfeit product, an expired product, or a product otherwise unsuitable for sale. Merchant 504 can resolve the error associated with the product, such as an indication of counterfeit, expired, or non-saleable status of the product, with a manufacturer or another entity in merchant 504's supply chain.

Merchant 504 having sold the product transfers 518 the product and the invoice to consumer 506. Consumer 506 may match 520 the MAN on the invoice and the MAN associated with the product. If the two MAN identifiers match, consumer 506 determines that the purchased product is an original product. If the MAN identifiers do not match, consumer 506 can determine, post-sale, that the product is a counterfeit product.

The registration phase, the inquiry phase, and the purchase phase depicted in FIGS. 3, 4, and 5 respectively may implicitly include a validation phase. In a validation phase according to an embodiment, a status being requested, such as by sending a CRN identifier of a product to a CDS, is verified to the requester. For example, the CDS may inform the requester that the product is an original product available for sale, has been sold, is a counterfeit, has expired, has been voided, has been returned, or has any other status relevant to the product or the supply chain.

With reference to FIG. 6, this figure depicts an example repository of CRN, CAN, and MAN sets maintained in a CDS in accordance with an illustrative embodiment. CDS 602 may be similar to CDS 502 in FIG. 5.

A record in records 604 includes a set of CRN, CAN, and MAN identifiers together with a status indicator. Although records 604 are depicted as being within CDS 602, an implementation may store records 604 in any data storage device using any form of data repository such that records 604 remain accessible to CDS 602 for reading, writing, or any other manipulations.

One status indicator is depicted in a record only for clarity of the description and not as a limitation on the invention. Any number of status indicators may be associated with a record within the scope of the invention.

For each set of CRN, CAN, and MAN identifiers in a record, the status indicator may be set to a value that represents the current status of the product associated with that set. For example, status value "0" may be used as shown at 606 to indicate that the associated product is an original product and available for sale. In one embodiment, CRN, CAN, and MAN sets of known counterfeit products may be maintained in records 604 with a suitable status indicator value.

With reference to FIG. 7, this figure depicts an example repository of CRN, CAN, and MAN sets updated in a CDS in accordance with an illustrative embodiment. CDS 702 may be similar to CDS 602 in FIG. 6. Records 704 may be implemented using records 604 and modified as depicted thereafter.

As some examples to illustrate an operation of an embodiment, some records in records 704 are shown in different status indicator values. For example, status value "1" may be used as shown at 706 to indicate that the associated product is an original product and has been sold. As another example, status value "V" may be used as shown at 608 to indicate that the CRN, CAN, and MAN set has been voided, or that the associated product is an original product but not available for sale.

The values "0", "1", and "V" are used only as example status indicator values without limitation of the invention. Any suitable alphanumeric or symbolic character or string may be similarly used within the scope of the invention.

Figure 8:
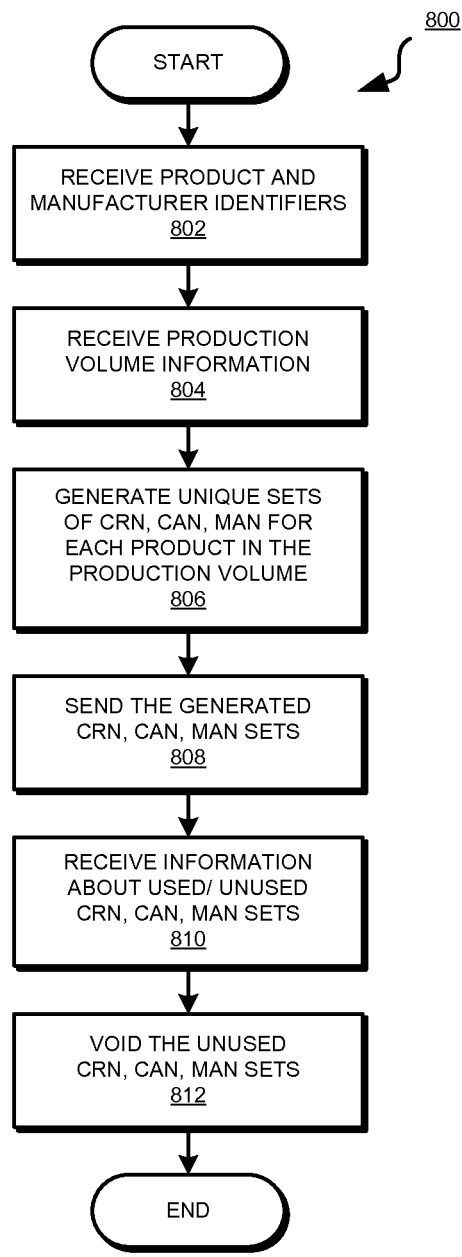
FIG. 8 depicts a flowchart of an example process of introducing products in a supply chain to mitigate the distribution or consumption of counterfeit products in accordance with an illustrative embodiment.

With reference to FIG. 8, this figure depicts a flowchart of an example process of introducing products in a supply chain to mitigate the distribution or consumption of counterfeit products in accordance with an illustrative embodiment. Process 800 may be implemented in a CDS, such as CDS 702 in FIG. 7.

Process 800 begins by receiving product and manufacturer identifiers (step 802). For example, step 802 may be a part of a registration phase as described with respect to an embodiment in this disclosure. A manufacturer identifier may be a name of the manufacturer, a symbol, or any value suitable for uniquely identifying a manufacturer in a CDS. Similarly, a product identifier may be any suitable identifier value sufficient to uniquely identify the product in the CDS.

Process 800 receives production volume information (step 804). For example, a manufacturer may send a number of units that the manufacturer wishes to produce of the product identified in step 802. Process 800 may generate unique sets of CRN, CAN, and MAN identifiers for each product in the production volume indicated in step 804 (step 806).

Process 800 sends the generated CRN, CAN, and MAN sets to the manufacturer (step 810). Process 800 may optionally receive a notification of any sets that go unused from the manufacturer (not shown). For example, an order at the manufacturer may be cancelled and the manufacturer may decide to produce fewer units of the product. Process 800 may optionally void or take other suitable alternative action with the unused sets of CRN, CAN, and MAN identifiers (step 812). Process 800 ends thereafter.

Figure 9:
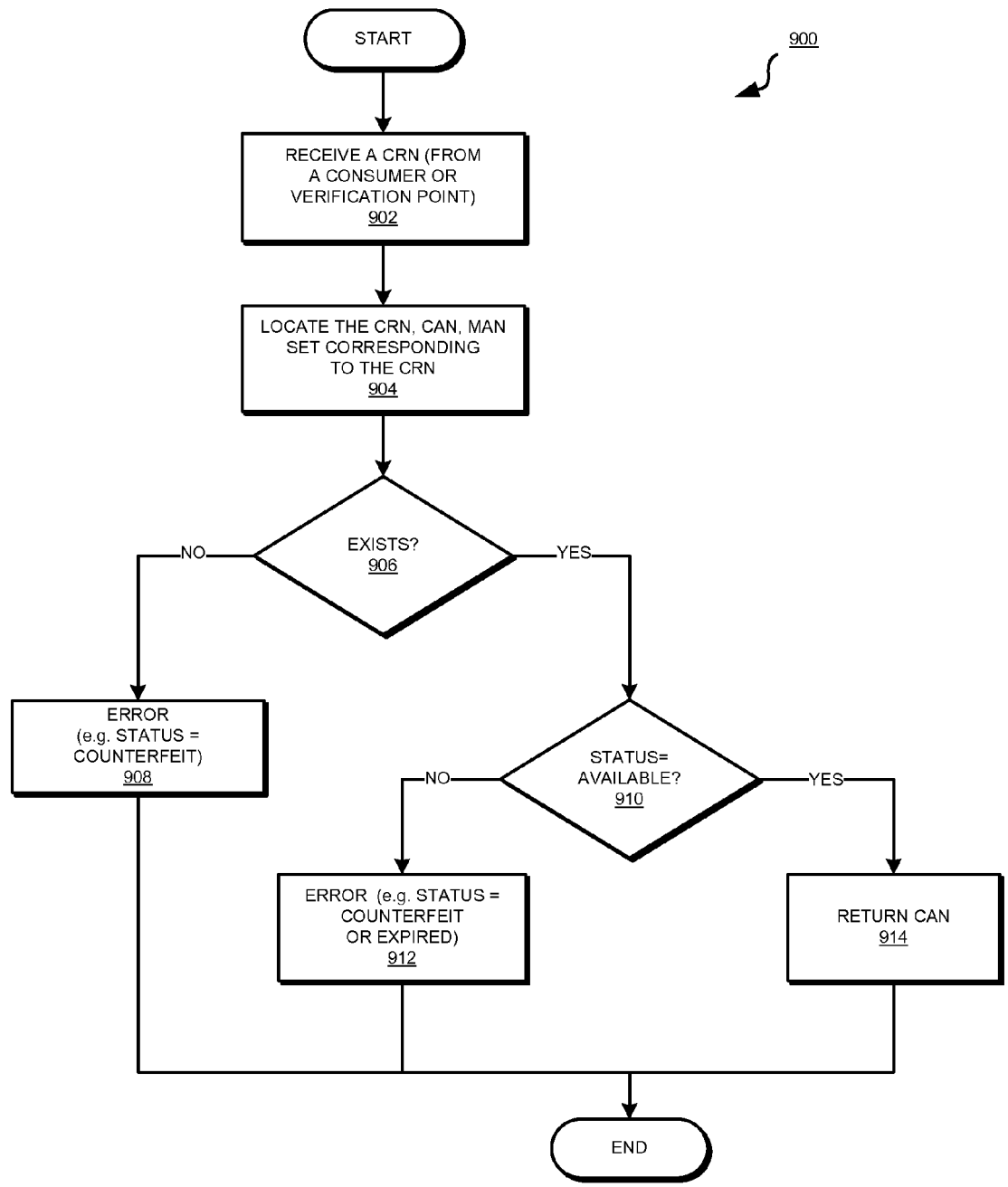
FIG. 9 depicts a flowchart of an example process of pre-purchase verification of the authenticity of products to mitigate the distribution or consumption of counterfeit products in accordance with an illustrative embodiment.

With reference to FIG. 9, this figure depicts a flowchart of an example process of pre-purchase verification of the authenticity of products to mitigate the distribution or consumption of counterfeit products in accordance with an illustrative embodiment. Process 900 may be implemented in a CDS, such as CDS 702 in FIG. 7.

Process 900 begins by receiving a CRN, such as from a consumer or a verification point (step 902). A kiosk data processing system at a merchant may be an example of a verification point. A mobile device may be another example of a verification point.

Process 900 attempts to locate a CRN, CAN, and MAN set corresponding to the CRN of step 902 (step 904). Process 900 determines whether such a set exists (step 906). If such a set does not exist in a repository accessible to process 900 ("No" path of step 906), process 900 may send an error (step 908). For example, process 900 may notify the sender of the CRN of step 902 that the CRN reflects a counterfeit product. Process 900 may end thereafter or perform additional actions (not shown) after step 908, such as notifying a suitable manufacturer.

If process 900 determines that the CRN, CAN, and MAN set exists ("Yes" path of step 906), process 900 may determine whether the set has a status that indicates that the product is available for sale (step 910). If the product associated with the set is not available ("No" path of step 910), process 900 may return an error (step 912). For example, process 900 may notify the sender of the CRN of step 902 that the CRN reflects a counterfeit or expired product. Process 900 may end thereafter or perform additional actions (not shown) after step 912, such as notifying a suitable manufacturer or a merchant.

If process 900 determines that the status associated with the CRN, CAN, and MAN set indicates that the associated product is available for sale ("Yes" path of step 910), process 900 returns the CAN identifier from the set to the requester of step 902 (step 914). Process 900 ends thereafter.

Figure 10:
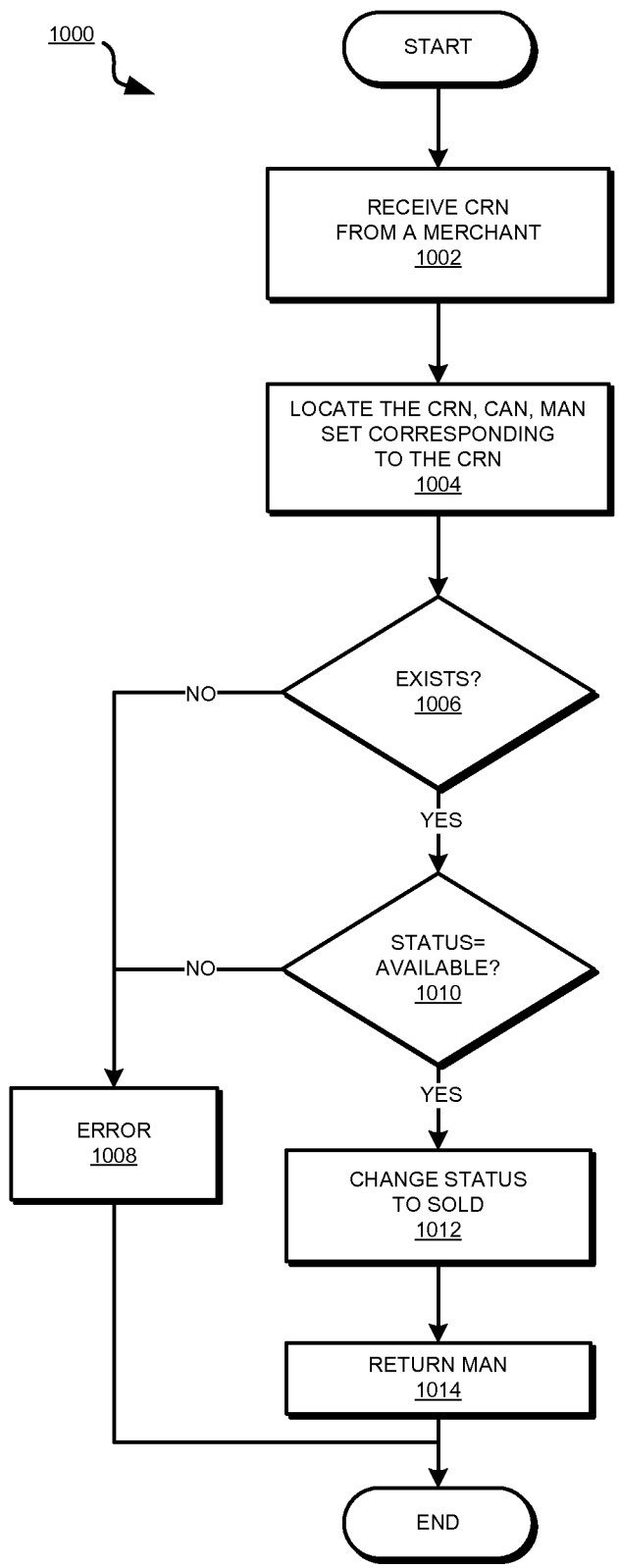
FIG. 10 depicts a flowchart of an example process of pre-sale verification of the authenticity of products to mitigate the distribution or consumption of counterfeit products in accordance with an illustrative embodiment.

With reference to FIG. 10, this figure depicts a flowchart of an example process of pre-sale verification of the authenticity of products to mitigate the distribution or consumption of counterfeit products in accordance with an illustrative embodiment. Process 1000 may be implemented in a CDS, such as CDS 702 in FIG. 7.

Process 1000 begins by receiving a CRN, such as from a merchant (step 1002). A POS system or application at a merchant may be an example of a sender of the CRN of step 1002. A mobile device may be another example of such a sender, such as a field sales equipment.

Process 1000 attempts to locate a CRN, CAN, and MAN set corresponding to the CRN of step 1002 (step 1004). Process 1000 determines whether such a set exists (step 1006). If such a set does not exist in a repository accessible to process 1000 ("No" path of step 1006), process 1000 may send an error (step 1008). For example, process 1000 may notify the sender of the CRN of step 1002 that the CRN reflects a counterfeit product. Process 1000 may end thereafter or perform additional actions (not shown) after step 1008, such as notifying a suitable manufacturer.

If process 1000 determines that the CRN, CAN, and MAN set exists ("Yes" path of step 1006), process 1000 may determine whether the set has a status that indicates that the product is available for sale (step 1010). If the product associated with the set is not available ("No" path of step 1010), process 1000 may return to step 1008 and send an error. For example, process 1000 may notify the sender of the CRN of step 1002 that the CRN reflects a counterfeit or expired product. Process 1000 may end thereafter or perform additional actions (not shown) after step 1008, such as notifying a suitable manufacturer or a merchant.

If process 1000 determines that the status associated with the CRN, CAN, and MAN set indicates that the associated product is available for sale ("Yes" path of step 1010), process 1000 changes the status of the located CRN, CAN, and MAN set to "sold" (step 1012). Process 1000 returns the MAN identifier from the set to the requester of step 1002 (step 1014). Process 1000 ends thereafter.

Figure 11:
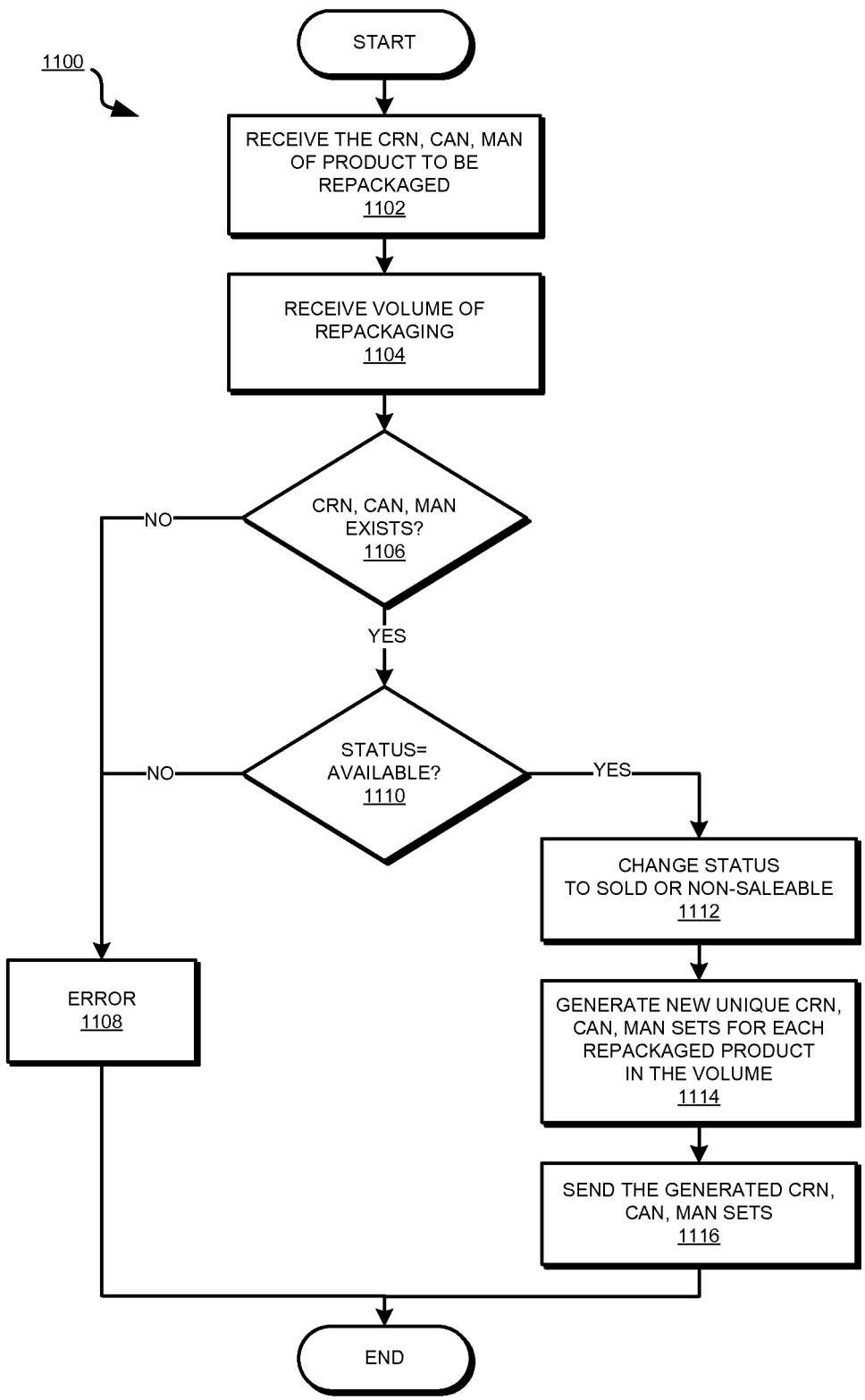
FIG. 11 depicts a flowchart of an example process of accommodating resale of products in a supply chain to mitigate the distribution or consumption of counterfeit products in accordance with an illustrative embodiment.

With reference to FIG. 11, this figure depicts a flowchart of an example process of accommodating resale of products in a supply chain to mitigate the distribution or consumption of counterfeit products in accordance with an illustrative embodiment. Process 1100 may be implemented in a CDS, such as CDS 702 in FIG. 7.

Process 1100 begins by receiving a CRN, such as from a merchant entity who may be a wholesaler (step 1102). Process 1100 receives volume information that indicates a number of units into which the product of the CRN will be repackaged (step 1104). Process 1100 determines whether a CRN, CAN, and MAN set corresponding to the CRN of step 1102 exists (step 1106). If such a set does not exist in a repository accessible to process 1100 ("No" path of step 1106), process 1100 may send an error (step 1108). For example, process 1100 may notify the sender of the CRN of step 1102 that the CRN reflects a counterfeit product. Process 1100 may end thereafter or perform additional actions (not shown) after step 1108, such as notifying a suitable manufacturer.

If process 1100 determines that the CRN, CAN, and MAN set exists ("Yes" path of step 1106), process 1100 may determine whether the set has a status that indicates that the product is available for sale (step 1110). If the product associated with the set is not available ("No" path of step 1110), process 1100 may return to step 1108 and send an error. For example, process 1100 may notify the sender of the CRN of step 1102 that the CRN reflects a counterfeit or expired product. Process 1100 may end thereafter or perform additional actions (not shown) after step 1108, such as notifying a suitable manufacturer or a merchant.

If process 1100 determines that the status associated with the CRN, CAN, and MAN set indicates that the associated product is available for sale ("Yes" path of step 1110), process 1100 changes the status of the located CRN, CAN, and MAN set to "sold" or non-saleable (step 1112). Process 1100 generates new unique CRN, CAN, and MAN sets for each repackaged product unit in the volume (step 1114). Process 1100 sends the generated sets to the requester of step 1102 (step 1116). Process 1100 ends thereafter.

Figure 12:
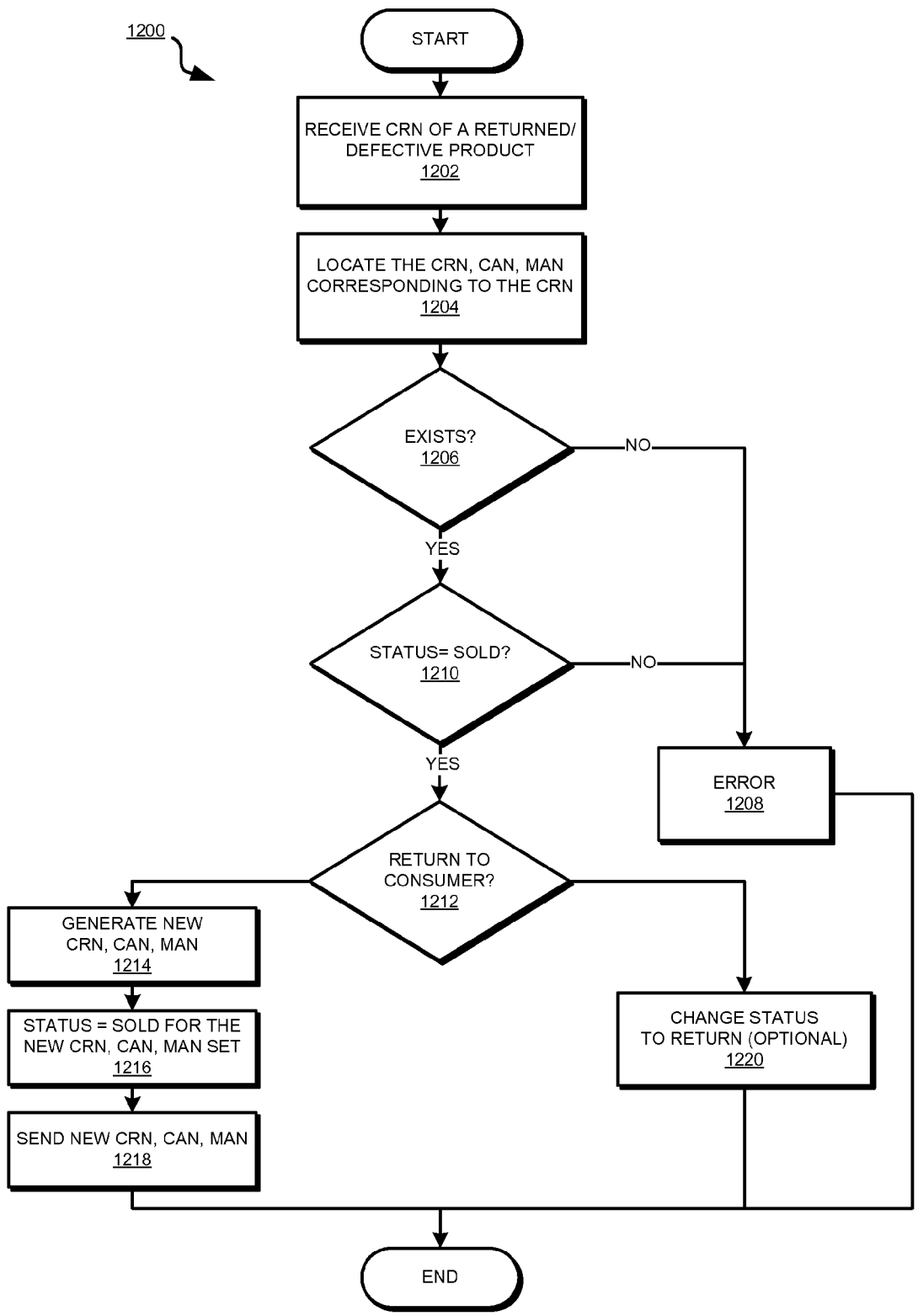
FIG. 12 depicts a flowchart of an example process of accommodating return or repair of products in a supply chain to mitigate the distribution or consumption of counterfeit products in accordance with an illustrative embodiment.

With reference to FIG. 12, this figure depicts a flowchart of an example process of accommodating return or repair of products in a supply chain to mitigate the distribution or consumption of counterfeit products in accordance with an illustrative embodiment. Process 1200 may be implemented in a CDS, such as CDS 702 in FIG. 7.

Process 1100 begins by receiving a CRN, such as from a merchant entity who may have accepted a returned product (step 1202). The returned product may be for returning to manufacturer, destruction, or for returning to consumer after repairs.

Process 1200 attempts to locate a CRN, CAN, and MAN set corresponding to the CRN of step 1202 (step 1204). Process 1200 determines whether a CRN, CAN, and MAN set corresponding to the CRN of step 1202 exists (step 1206). If such a set does not exist in a repository accessible to process 1200 ("No" path of step 1206), process 1200 may send an error (step 1208). For example, process 1200 may notify the sender of the CRN of step 1202 that the CRN reflects a counterfeit product. Process 1200 may end thereafter or perform additional actions (not shown) after step 1208, such as notifying a suitable manufacturer.

If process 1200 determines that the CRN, CAN, and MAN set exists ("Yes" path of step 1206), process 1200 may determine whether the set has a status that indicates that the product is indicated as "sold" (step 1210). If the product associated with the set is not indicated as "sold" ("No" path of step 1210), process 1200 may return to step 1208 and send an error. For example, process 1200 may notify the sender of the CRN of step 1202 that the CRN reflects a counterfeit product. Process 1100 may end thereafter or perform additional actions (not shown) after step 1208, such as notifying a suitable manufacturer or a merchant.

If process 1200 determines that the status associated with the CRN, CAN, and MAN set indicates that the associated product has been sold ("Yes" path of step 1210), process 1200 determines whether the product has to be returned to the consumer, such as after repairs (step 1212). The sender of the CRN in step 1202 may also send an indication whether the product is to be returned to the consumer. Such an indication may be utilized for step 1212.

If the product has to be returned to the consumer ("Yes" path of step 1212), process 1200 generates new CRN, CAN, and MAN set for the product associated with the CRN of step 1202 (step 1214). Process 1200 changes the status of the generated CRN, CAN, and MAN set to "sold" or non-saleable (step 1216). Process 1200 sends the generated sets to the requester of step 1202 (step 1218). Process 1200 ends thereafter.

If the product is not to be returned to the consumer ("No" path of step 1212), process 1200 may optionally set the status of the CRN, CAN, and MAN set associated with the CRN of step 1202 to a status other than "sold", such as "returned" (step 1220). Process 1200 may end thereafter. Changing the status from "sold" to, for example, "returned" may enable other inventory management functions using the CDS where process 1200 may be implemented.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for mitigating the distribution or consumption of counterfeit products. Using an embodiment of the invention, a CDS may be implemented as a third party service that is trusted by manufacturers, merchants, and consumers. Such a service may be utilized for the various phases according to the various embodiments using any suitable device, data processing system, application or a combination thereof. Furthermore, an embodiment may be used in conjunction with an existing inventory management or counterfeit control method.

More than one CDS may exist in a given supply chain. A counterfeiter may be prevented from introducing their own CDS for fielding CRN of counterfeit products, any existing technique may be used in conjunction with an embodiment. For example, presently a certificate can be validated only by its designated root certificate authority (CA). Anyone running a certificate server can become a root CA, however, applications can be presently designed to trust only certain root CA and not others. In an analogous manner, certain CDS may be configured as the trusted CDS and other CDS, even though introduced by counterfeiters, may be treated with suspicion or ignored in the manner an unknown root CA is not trusted or ignored today. Many other ways of utilizing more than one trusted CDS and avoiding counterfeiter's CDS will be apparent to those of ordinary skill in the art from the examples and other contents in this disclosure.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for mitigating distribution of a counterfeit product, the computer implemented method comprising:
    configuring a network with at least three independent systems, a first system being configured as a trusted counterfeit detection service (CDS) such that another system acting as a CDS will be ignored by a second system and a third system, the second system operating as a point of sale (POS) system and configured to confirm an authenticity of a product in a data communication with the first system; and the third system operating as a user device and configured to confirm the authenticity of the product in a separate data communication with the first system;
    generating, using a processor and a memory, in a first application executing in the first system, a first set of identifiers to associate with a product to be manufactured, the first set of identifiers including identifiers corresponding to a customer reference number (CRN), a customer acknowledgment number (CAN), and a merchant acknowledgment number (MAN), wherein the CRN uniquely identifies the product, the CAN is used by a user for determining the authenticity of the product, and the MAN is used by the merchant for determining the authenticity of the product;
    associating the first set of identifiers with the product and a status indicator;
    setting the status indicator to a first value representative of the product being an original product and the product being available for sale;
    transmitting, from the CDS of the first system to establish the authenticity of the product, and responsive to the third system sending the CRN to the first system the CAN to the third system; and
    transmitting, from the CDS of the first system to establish the authenticity of the product, and responsive to the second system sending the CRN to the first system, the MAN to the second system.

2. The computer implemented method of claim 1, wherein the first set of identifiers is one of a plurality of sets of CRN, CAN, and MAN identifiers, further comprising:
    receiving a first CRN;
    matching the first CRN with a CRN in a searched set of identifiers in the plurality of sets of identifiers;
    confirming whether a second status indicator associated with the searched set of identifiers indicates that a second product associated with the located set of identifiers is available for sale; and
    sending an error, responsive to either of the matching and the confirming being negative.

3. The computer implemented method of claim 2, wherein the error communicates to a receiver application that the first CRN is associated with the counterfeit product.

4. The computer implemented method of claim 2, wherein the error communicates to a receiver application that the first CRN is associated with a product that has expired.

5. The computer implemented method of claim 2, wherein the first CRN is received from the third system, further comprising:
validating authenticity of a product associated with the first CRN by sending a CAN corresponding to the first CRN, responsive to both the matching and the confirming being affirmative.

6. The computer implemented method of claim 1, wherein the first set of identifiers is one of a plurality of sets of CRN, CAN, and MAN identifiers, further comprising:
receiving a second CRN, wherein the second CRN is received from the second system;
matching the second CRN with a CRN in a searched set of identifiers in the plurality of sets of identifiers;
confirming whether a third status indicator associated with the searched set of identifiers indicates that a third product associated with the located set of identifiers is available for sale;
validating authenticity of a product associated with the second CRN by sending a MAN corresponding to the second CRN, responsive to both the matching and the confirming being affirmative; and
updating the third status to indicate that the product associated with the second CRN is sold.

7. The computer implemented method of claim 1, wherein the first set of identifiers is one of a plurality of sets of CRN, CAN, and MAN identifiers, further comprising:
receiving a third CRN, wherein the third CRN is received for repackaging of the product;
matching the third CRN with a CRN in a searched set of identifiers in the plurality of sets of identifiers;
confirming whether a fourth status indicator associated with the searched set of identifiers indicates that a fourth product associated with the located set of identifiers is available for sale;
changing the fourth status to indicate that a product associated with the third CRN is sold, responsive to both the matching and the confirming being affirmative;
generating a second plurality of sets of identifiers such that one set of identifiers in the second plurality of sets is associated with one unit resulting from the repackaging of the product; and
setting a status indicator associated with a set in the second plurality of sets to indicate availability for sale.

8. The computer implemented method of claim 1, wherein the first set of identifiers is one of a plurality of sets of CRN, CAN, and MAN identifiers, further comprising:
receiving a third CRN, wherein the third CRN is received for repackaging of the product;
matching the third CRN with a CRN in a searched set of identifiers in the plurality of sets of identifiers;
confirming whether a fourth status indicator associated with the searched set of identifiers indicates that a fourth product associated with the located set of identifiers is available for sale;
changing the fourth status to indicate that a product associated with the third CRN is sold, responsive to both the matching and the confirming being affirmative;
generating a second plurality of sets of identifiers such that one set of identifiers in the second plurality of sets is associated with one unit resulting from the repackaging of the product; and
setting a status indicator associated with a set in the second plurality of sets to indicate availability for sale.

9. The computer implemented method of claim 1, wherein the first set of identifiers is one of a plurality of sets of CRN, CAN, and MAN identifiers, further comprising:
receiving a fourth CRN, wherein the fourth CRN is received for a return of the product received from a consumer;
matching the fourth CRN with a CRN in a searched set of identifiers in the plurality of sets of identifiers;
confirming whether a fifth status indicator associated with the searched set of identifiers indicates that a fifth product associated with the located set of identifiers is sold;
determining whether the product is to be returned to the consumer, responsive to both the matching and the confirming being affirmative, forming a returning to consumer determination;
generating a second set of identifiers responsive to the returning to consumer determination being affirmative;
associating the second set of identifiers with the product; and
setting a status indicator associated with the second set to indicate non-availability for sale.

10. The computer implemented method of claim 1, wherein the product is a unit of manufacture of the product.

11. A computer usable program product comprising a non-transitory computer usable storage device including computer usable code for mitigating distribution of a counterfeit product, the computer usable code comprising:
computer usable code for configuring a network with at least three independent systems, a first system being configured as a trusted counterfeit detection service (CDS) such that another system acting as a CDS will be ignored by a second system and a third system, the second system operating as a point of sale (POS) system and configured to confirm an authenticity of a product in a data communication with the first system; and the third system operating as a user device and configured to confirm the authenticity of the product in a separate data communication with the first system;
computer usable code for generating in a first application executing in the first system, a first set of identifiers to associate with a product to be manufactured, the first set of identifiers including identifiers corresponding to a customer reference number (CRN), a customer acknowledgment number (CAN), and a merchant acknowledgment number (MAN), wherein the CRN uniquely identifies the product, the CAN is used by a user for determining the authenticity of the product, and the MAN is used by the merchant for determining the authenticity of the product;
computer usable code for associating the first set of identifiers with the product and a status indicator;
computer usable code for setting the status indicator to a first value representative of the product being an original product and the product being available for sale;
computer usable code for transmitting, from the CDS of the first system to establish the authenticity of the product, and responsive to the third system sending the CRN to the first system, the CAN to the third system; and
computer usable code for transmitting, from the CDS of the first system to establish the authenticity of the product, and responsive to the second system sending the CRN to the first system, the MAN to the second system.

12. The computer usable program product of claim 11, further comprising:

computer usable code for receiving a registration request, the registration request including an identifier of a manufacturer of the product and an identifier of the product; and computer usable code for receiving a production volume information, the production volume information including a number of units of the product to be produced, wherein the first set of identifiers is a plurality of sets of identifiers, such that one set of identifiers is associated with one unit of the product being produced.

13. The computer usable program product of claim 11, wherein the first application is a counterfeit detection service (CDS), the second application is a registration application executing in a second data processing system, wherein the CDS is a trusted service accessible to a manufacturer of the product, a merchant of the product, and a consumer of the product for verification of authenticity of the product.

14. The computer usable program product of claim 11, wherein the status indicator is set to a second value to indicate that the product is the counterfeit product.

15. The computer usable program product of claim 11, further comprising:
    computer usable code for generating a second set of identifiers for a second product;
    computer usable code for receiving a notification that the second product is not produced; and
    computer usable code for voiding the second set of identifiers by setting the status indicator to a third value.

16. The computer usable program product of claim 11, wherein the computer usable code is stored in a non-transitory computer readable storage medium in a data processing system, and wherein the computer usable code is transferred over a network from a remote data processing system.

17. The computer usable program product of claim 11, wherein the computer usable code is stored in a non-transitory computer readable storage medium in a server data processing system, and wherein the computer usable code is downloaded over a network to a remote data processing system for use in a non-transitory computer readable storage medium associated with the remote data processing system.

18. A data processing system for mitigating distribution of a counterfeit product, the data processing system comprising:
    a storage device including a non-transitory storage medium, wherein the storage device stores computer usable program code; and
    a processor, wherein the processor executes the computer usable program code, and wherein the computer usable program code comprises:
    computer usable code for configuring a network with at least three independent systems, a first system being configured as a trusted counterfeit detection service (CDS) such that another system acting as a CDS will be ignored by a second system and a third system, the second system operating as a point of sale (POS) system and configured to confirm an authenticity of a product in a data communication with the first system; and the third system operating as a user device and configured to confirm the authenticity of the product in a separate data communication with the first system;
    computer usable code for generating in a first application executing in the first system, a first set of identifiers to associate with a product to be manufactured, the first set of identifiers including identifiers corresponding to a customer reference number (CRN), a customer acknowledgment number (CAN), and a merchant acknowledgment number (MAN), wherein the CRN uniquely identifies the product, the CAN is used by a user for determining the authenticity of the product, and the MAN is used by the merchant for determining the authenticity of the product;
    computer usable code for associating the first set of identifiers with the product and a status indicator;
    computer usable code for setting the status indicator to a first value representative of the product being an original product and the product being available for sale;
    computer usable code for transmitting, from the CDS of the first system to establish the authenticity of the product, and responsive to the third system sending the CRN to the first system, the CAN to the third system; and
    computer usable code for transmitting, from the CDS of the first system to establish the authenticity of the product, and responsive to the second system sending the CRN to the first system, the MAN to the second system.

19. The data processing system of claim 18, wherein the first set of identifiers is one of a plurality of sets of CRN, CAN, and MAN identifiers, further comprising:
    computer usable code for receiving a first CRN;
    computer usable code for matching the first CRN with a CRN in a searched set of identifiers in the plurality of sets of identifiers;
    computer usable code for confirming whether a second status indicator associated with the searched set of identifiers indicates that a second product associated with the located set of identifiers is available for sale; and
    computer usable code for sending an error, responsive to either of the matching and the confirming being negative.

20. The data processing system of claim 19, wherein the error communicates to a receiver application that the first CRN is associated with the counterfeit product.

* * * * *